US012565182B2

(12) United States Patent
Scott

(10) Patent No.: US 12,565,182 B2
(45) Date of Patent: Mar. 3, 2026

(54) AUTONOMOUS BRAKE WEAR ESTIMATION

(71) Applicant: Valeo Schalter und Sensoren GmbH, Bietigheim-Bissingen (DE)

(72) Inventor: Daniel Bartram Scott, Bietigheim-Bissingen (DE)

(73) Assignee: Valeo Schalter und Sensoren GmbH (DE)

( * ) Notice: Subject to any disclaimer, the term of this patent is extended or adjusted under 35 U.S.C. 154(b) by 210 days.

(21) Appl. No.: 18/443,557

(22) Filed: Feb. 16, 2024

(65) Prior Publication Data

US 2025/0263051 A1     Aug. 21, 2025

(51) Int. Cl.
| | |
|---|---|
| *B60T 8/174* | (2006.01) |
| *B60T 7/22* | (2006.01) |
| *B60T 8/171* | (2006.01) |
| *B60T 8/172* | (2006.01) |
| *B60T 8/32* | (2006.01) |
| *B60T 17/22* | (2006.01) |

(52) U.S. Cl.
CPC ............... *B60T 8/174* (2013.01); *B60T 7/22* (2013.01); *B60T 8/171* (2013.01); *B60T 8/172* (2013.01); *B60T 8/321* (2013.01); *B60T 8/326* (2013.01); *B60T 17/22* (2013.01); *B60T 2210/32* (2013.01); *B60T 2220/04* (2013.01); *B60T 2250/00* (2013.01); *B60T 2250/04* (2013.01)

(58) Field of Classification Search
CPC . B60T 7/22; B60T 8/171; B60T 8/172; B60T 8/174; B60T 8/321; B60T 8/326; B60T 17/22; B60T 17/221; B60T 2210/32; B60T 2220/04; B60T 2250/00; B60T 2250/04
See application file for complete search history.

(56) References Cited

U.S. PATENT DOCUMENTS

| | | | |
|---|---|---|---|
| 8,812,211 B2 | 8/2014 | Svensson et al. | |
| 10,328,913 B2 | 6/2019 | Li et al. | |
| 11,498,543 B2 | 11/2022 | Yu | |

(Continued)

FOREIGN PATENT DOCUMENTS

| | | |
|---|---|---|
| CN | 115712988 A | 2/2023 |
| DE | 102021114488 A1 | 12/2022 |

(Continued)

*Primary Examiner* — John M Zaleskas
(74) *Attorney, Agent, or Firm* — Dickinson Wright PLLC

(57) ABSTRACT

Methods and systems for estimating autonomous brake wear in a vehicle. A brake table includes a correspondence between a desired brake request and an applied brake force. Vehicle deceleration data is generated during several braking events of the vehicle. The vehicle deceleration data includes (i) desired brake requests issued during the braking events, and (ii) vehicle speeds during the brake request. A learning model is executed on the deceleration data. The learning model is configured to estimate a brake wear based on changes in differences between (a) the desired brake requests issued during the braking events and (b) the vehicle speeds during the brake requests. Based on the estimated brake wear, the brake table is modified in order to yield a modified brake table. A new desired brake request is generated using the modified brake table.

20 Claims, 4 Drawing Sheets

170

172 — Store Brake Table

174 — Generate Vehicle Deceleration Data Over Several Braking Events

176 — Store Vehicle Deceleration Data

178 — Execute Learning Model On Deceleration Data To Estimate A Brake Wear Based On Changes Between Desired Brake Requests And Vehicle Speeds During The Brake Requests 180 — Modify Brake Table Based On Estimated Brake Wear 182 — Utilize Modified Brake Table To Generate New Applied Brake Force

(56) References Cited

U.S. PATENT DOCUMENTS

| | | | | |
|---|---|---|---|---|
| 2008/0236269 A1* | 10/2008 | Howell | | B60T 17/221 |
| | | | | 73/121 |
| 2012/0074770 A1* | 3/2012 | Lee | | B60T 13/662 |
| | | | | 701/70 |
| 2013/0332043 A1* | 12/2013 | Svensson | | B60T 8/17 |
| | | | | 701/70 |
| 2018/0134161 A1* | 5/2018 | Gaither | | B60L 7/26 |
| 2018/0141526 A1* | 5/2018 | Li | | B60T 8/172 |
| 2019/0061717 A1* | 2/2019 | Takemura | | B60T 13/686 |
| 2019/0084548 A1* | 3/2019 | Ohazulike | | F16D 66/00 |
| 2019/0389442 A1* | 12/2019 | Kim | | B60T 7/12 |
| 2020/0062233 A1* | 2/2020 | Yu | | B60T 13/662 |
| 2020/0216051 A1* | 7/2020 | Mannherz | | B60T 13/66 |
| 2020/0331447 A1* | 10/2020 | Lee | | B60T 17/221 |
| 2021/0146895 A1* | 5/2021 | Tsugoshi | | B60T 13/665 |
| 2022/0018413 A1* | 1/2022 | Matsui | | F16D 66/00 |
| 2022/0018414 A1* | 1/2022 | Matsui | | B60T 17/22 |
| 2022/0212642 A1* | 7/2022 | Forghani | | B60T 7/042 |
| 2022/0396248 A1* | 12/2022 | Patterson | | B60T 7/042 |
| 2023/0077346 A1* | 3/2023 | Scharbak | | B60T 7/12 |
| | | | | 701/70 |
| 2023/0272831 A1* | 8/2023 | Bansal | | F16D 66/02 |
| | | | | 188/1.11 L |
| 2024/0400031 A1* | 12/2024 | Diamond | | B60T 17/221 |
| 2025/0236277 A1* | 7/2025 | Lim | | B60T 17/22 |

FOREIGN PATENT DOCUMENTS

| | | | | | |
|---|---|---|---|---|---|
| DE | 102021214093 A1 * | 6/2023 | | | B60T 17/22 |
| WO | WO-2012079801 A2 * | 6/2012 | | | B60T 8/88 |

* cited by examiner

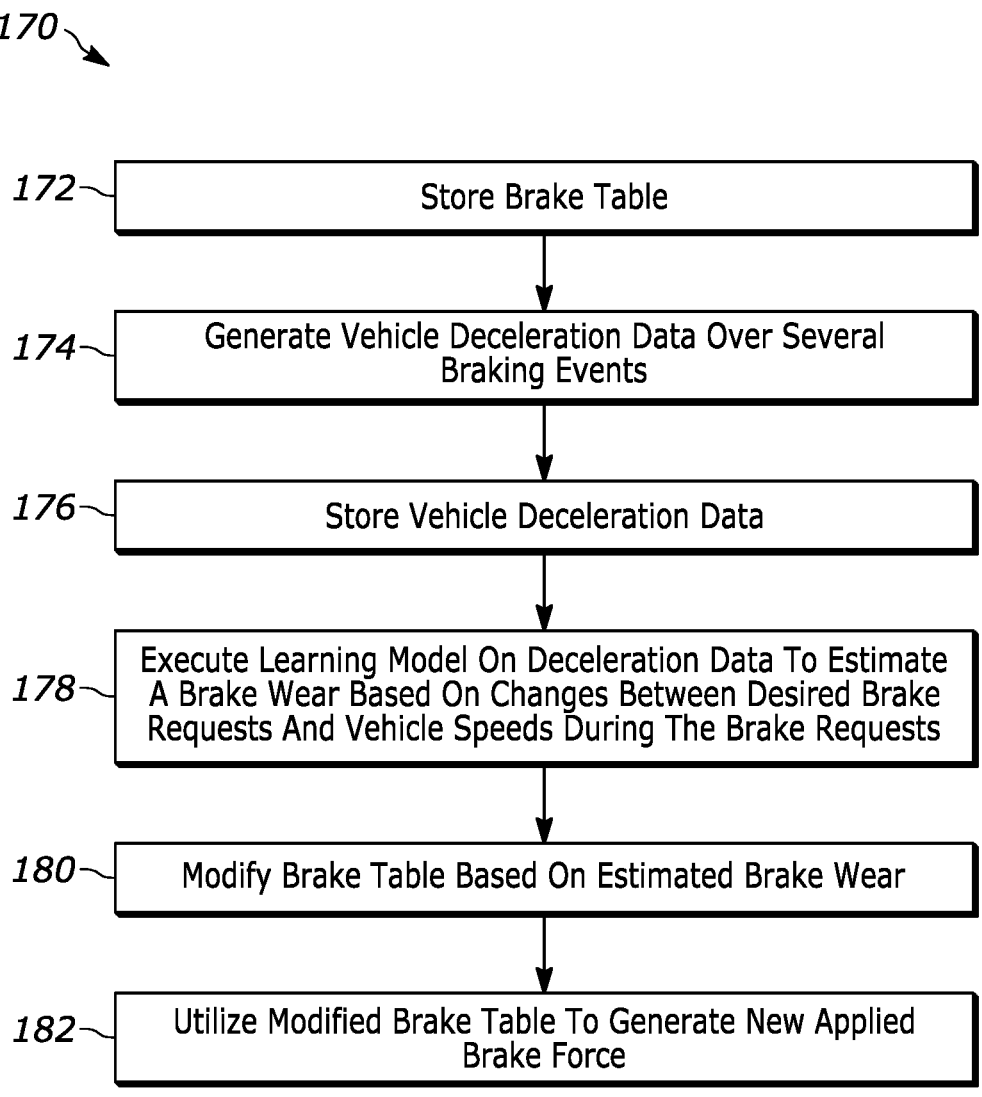

170

172 — Store Brake Table

174 — Generate Vehicle Deceleration Data Over Several Braking Events

176 — Store Vehicle Deceleration Data

178 — Execute Learning Model On Deceleration Data To Estimate A Brake Wear Based On Changes Between Desired Brake Requests And Vehicle Speeds During The Brake Requests 180 — Modify Brake Table Based On Estimated Brake Wear 182 — Utilize Modified Brake Table To Generate New Applied Brake Force

FIG. 4

AUTONOMOUS BRAKE WEAR ESTIMATION

TECHNICAL FIELD

The present disclosure relates to estimating brake wear in an automotive vehicle.

BACKGROUND

Brake systems in autonomous vehicles play a crucial role in ensuring safe and efficient operation. These systems are integrated into the overall autonomous driving architecture to enable precise control and management of braking functions. These brake systems rely on data from sensors, which work to gather information about the vehicle's surroundings, providing real-time information about obstacles, traffic, and road conditions to enable the vehicle to automatically brake accordingly. Brake control systems in autonomous vehicles are highly sophisticated, allowing for precise modulation of brake pressure to each wheel independently. This enables the vehicle to optimize braking performance, prevent wheel lockup, and maintain stability.

Vehicle brakes wear down over time due to normal usage, regardless of whether the vehicle is an autonomous vehicle or a conventional (non-autonomous) vehicle. Brake wear refers generally to the gradual reduction of the effectiveness of the vehicle's brakes over time. For example, brake wear can occur over time as the friction material on brake pads gradually deteriorates due to repeated contact with the brake rotor during braking. This wear is a natural part of the braking process, but excessive wear can lead to several problems. As the friction material gets thinner, braking performance diminishes, resulting in longer stopping distances and reduced stopping power. Neglecting to address brake wear can compromise vehicle safety and result in more extensive and costly brake repairs over time.

SUMMARY

According to an embodiment, a method of adjusting vehicle braking performance based on estimated brake wear includes the following: storing a brake table in storage associated with a vehicle, wherein the brake table includes a correspondence between a desired brake request and an applied brake force; generating vehicle deceleration data during several braking events of the vehicle, wherein the vehicle deceleration data includes (i) desired brake requests issued during the braking events, and (ii) vehicle speeds during the brake request; storing the vehicle deceleration data in the storage; executing a learning model on the deceleration data stored in the storage, wherein the learning model is configured to estimate a brake wear based on changes in differences between (a) the desired brake requests issued during the braking events and (b) the vehicle speeds during the brake requests; modifying the brake table based on the estimated brake wear in order to yield a modified brake table; and generating a new desired brake request utilizing the modified brake table.

In another embodiment, a system for estimating brake wear and adjusting vehicle braking performance in a vehicle includes a storage that stores a brake table associated with a vehicle, wherein the brake table is accessed during a braking event and includes a correspondence between a desired brake request and an applied brake force. The system includes a plurality of image sensors configured to detect objects in an environment surrounding the vehicle. The system includes a plurality of vehicle sensors configured to generate deceleration data associated with deceleration of the vehicle, the vehicle deceleration data includes (i) desired brake requests issued during the braking events, and (ii) vehicle speeds during the brake request. The system includes a processor in communication with the storage, the plurality of image sensors, and the plurality of vehicle sensors. The processor is programmed to perform the following: generate, via the vehicle sensors, the deceleration data over a series of braking events of the vehicle; execute a learning model on the deceleration data, wherein the learning model is configured to estimate a brake wear based on changes in differences between (a) the desired brake requests issued during the braking events and (b) the vehicle speeds during the brake requests; modify the brake table based on the estimated brake wear in order to yield a modified brake table; and generate, in response to the image sensors detecting one or more objects in the environment, a new desired brake request utilizing the modified brake table.

In another embodiment, a tangible, non-transitory computer-readable medium has instructions stored thereon that are executable by one or more processors to cause an automatic braking adjustment system to perform functions such as those above.

BRIEF DESCRIPTION OF THE DRAWINGS

FIG. 4 shows a method of adjusting vehicle braking performance based on estimated brake wear, according to an embodiment.

DETAILED DESCRIPTION

Figure 1:
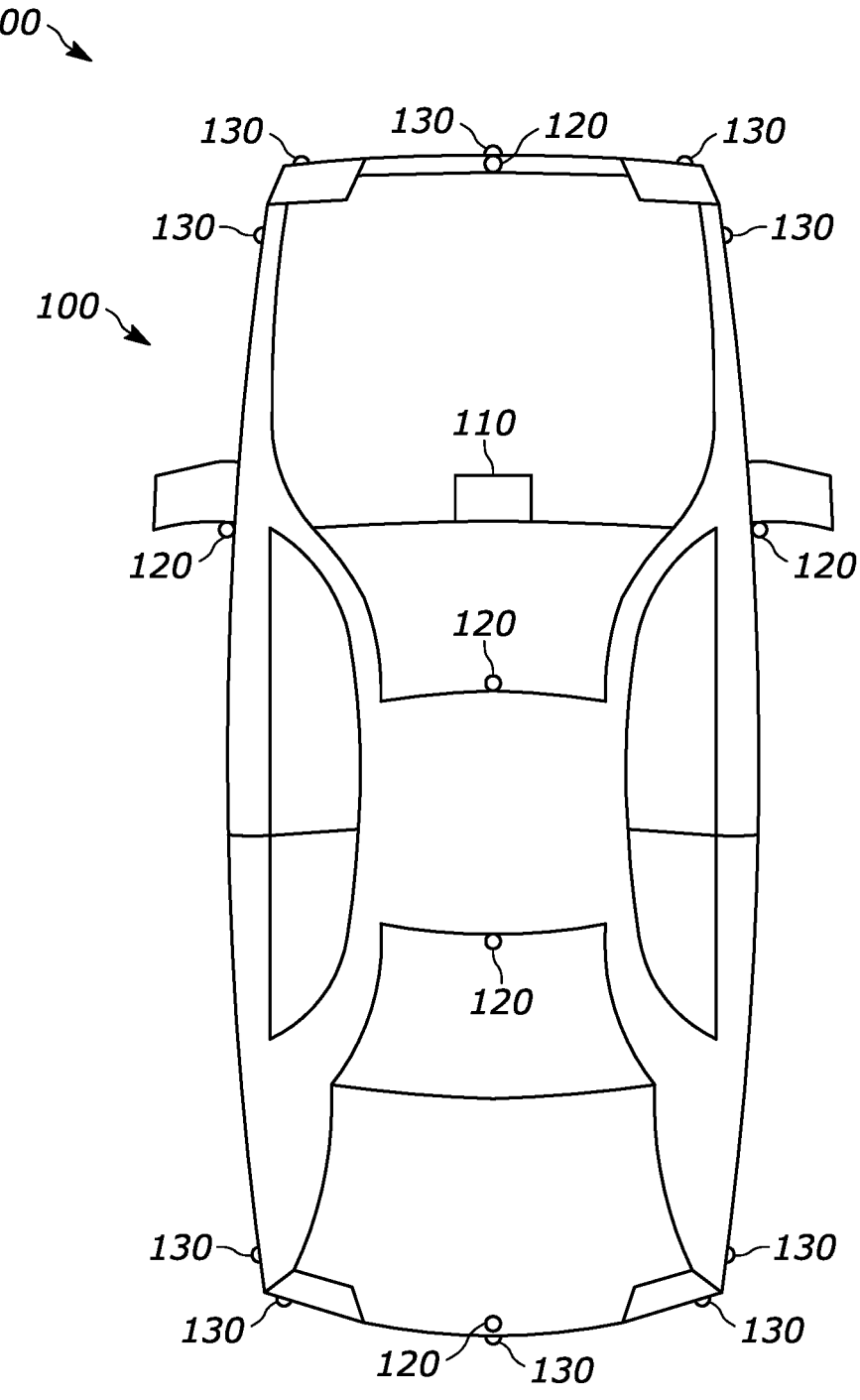
FIG. 1 shows an overhead schematic view of a vehicle according to an embodiment.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

"A", "an", and "the" as used herein refers to both singular and plural referents unless the context clearly dictates otherwise. By way of example, "a processor" programmed to perform various functions refers to one processor programmed to perform each and every function, or more than one processor collectively programmed to perform each of the various functions.

As used herein, the term "autonomous vehicle" is intended to cover fully-autonomous vehicle capable of performing all driving tasks without human intervention (e.g., Level 4 or Level 5 automation as set by SAE standards), or semi-autonomous vehicle that automate some driving tasks but require human supervision and active engagement of a human driver (e.g., Level 2 or Level 3 automation according to SAE).

Brake systems in autonomous vehicles play a vital role in ensuring safe and efficient vehicle operation. These systems are integrated into the broader vehicle architecture of autonomous driving to enable precise control and oversight of braking functions. These brake systems rely on data from sensors, which work to gather information about the vehicle's surroundings, providing real-time information about obstacles, traffic, and road conditions to enable the vehicle to automatically brake accordingly.

Brake systems typically rely on brake tables to command the proper amount of brake force. In the context of a conventional, non-autonomous brake system, a brake table is a data structure that establishes a correspondence between the driver's input (i.e., brake pedal pressure or force) and the desired braking force applied to each wheel. In the context of an autonomous braking system, a brake table establishes a correspondence between the sensor data that generates a brake request, and the in-turn desired braking force applied to each wheel. This table can be used by the vehicle's control system to modulate the braking force on each wheel independently, ensuring optimal braking performance while preventing wheel lockup or skidding.

Brake tables help the vehicle's control system adjust braking force in real-time based on various factors such as vehicle speed, road conditions, and vehicle load. They also allow the control system to manage the braking force applied to each wheel to maintain the best balance between stopping the vehicle quickly and preventing loss of traction or instability.

Brake wear can impact the performance of the vehicle's braking system. Brake wear, also referred to as brake fading, refers generally to the gradual reduction of the effectiveness of the vehicle's brakes over time. Brake wear primarily occurs on the components involved in generating friction to slow down and stop the vehicle, such as the brake pads and rotor. For example, brake wear can occur over time as the friction material on brake pads gradually deteriorates due to repeated contact with the brake rotor during braking. This wear is a natural part of the braking process, but excessive wear can lead to several problems. Typical brake tables do not account for brake wear. Thus, the amount of pedal force delivered by a human (or braking force requested from an autonomous braking system) can look vastly different when the vehicle has been driven 100,000 miles compared to when the vehicle is brand new.

Therefore, according to various embodiments described herein, methods and systems for adjusting vehicle braking performance based on estimated brake wear are provided. In embodiments, a brake table is utilized that includes a correspondence between a desired brake request and an applied brake force. During several braking events of the vehicle, the vehicle's system can generate vehicle deceleration data including, for example, the desired brake requests issued during the braking events and the vehicle speeds realized during the brake requests. A learning model can be executed on this data to estimate the brake wear. Over time, as the difference between the desired brake requests issued and the corresponding realized vehicle speeds increases, the brake wear can be estimated accordingly. With the brake wear estimated, the brake table can be modified so that new brake requests can use the modified brake table to generate a new, more appropriate brake force that accounts for the estimated brake wear.

These systems and methods can improve vehicle responsiveness and safety. If unaccounted for, brake wear can negatively impact an autonomous braking system's reliability. For example, if the sensed environment outside of the vehicle dictates an aggressive braking event to avoid a detected object in the vehicle's path, a brake table might dictate that the autonomous braking system issue a brake request of a given magnitude. However, if brake wear is unaccounted for, the given magnitude of a brake request might not be sufficient to safely brake the vehicle. Thus, the methods and systems disclosed herein estimate the brake wear such that the brake tables can be adjusted, resulting in more appropriate brake forces realized.

FIG. 1 illustrates an overhead schematic of a vehicle 100 equipped with an autonomous braking system, according to an embodiment. The vehicle 100 may be an autonomous vehicle, or other type of vehicle in which brake commands are issued in situations other than a driver pressing a brake pedal; this can be referred to as autonomous braking. The vehicle 100 is a passenger car, but can be other types of vehicles such as a truck, van, or sports utility vehicle (SUV), or the like. The vehicle is shown in an environment 200. The vehicle 100 is equipped with a vehicle electronics control unit (VECU) 110, also referred to as a vehicle controller. The vehicle controller controls various sub-systems in the vehicle, such as the vehicle's maneuvering system, acceleration system, and braking system by issuing commands to appropriate system-level controllers. In addition, the vehicle 100 includes a plurality of vehicle sensors 120, 130 arranged about the vehicle and configured to sense qualities about the environment 200. In one embodiment, the vehicle sensors include optical sensors 120 and ultrasonic sensors 130, which can collectively be referred to as image sensors. The optical sensors 120 can include, for example, cameras, radar, lidar, and the like. The optical sensors 120 can each capture an image of a respective area from the environment 200 of the vehicle 100 and output it as an optical sensor signal. A processor associated with each (or all) of the optical sensors 120 can generate optical sensor data associated with the optical sensors 120. The ultrasonic sensors 130 are configured to detect a distance to objects in the environment 200, such as other vehicles, pedestrians, and other objects. These sensors 130 output a corresponding sensor signal, which again is processed by an associated processor(s) to generate ultrasonic sensor data. Using the sensor data generated by the optical sensors 120 and/or ultrasonic sensors 130, the vehicle controller 110 is able to operate the vehicle 100 semi-autonomously or fully-autonomously. Other sensors not illustrated (e.g., wheel speed sensor, steering wheel angle sensor, microphone, acceleration sensor, antenna, etc.) can also be provided to help the vehicle controller 110 issue operational commands to maneuver the vehicle 100.

Figure 2:
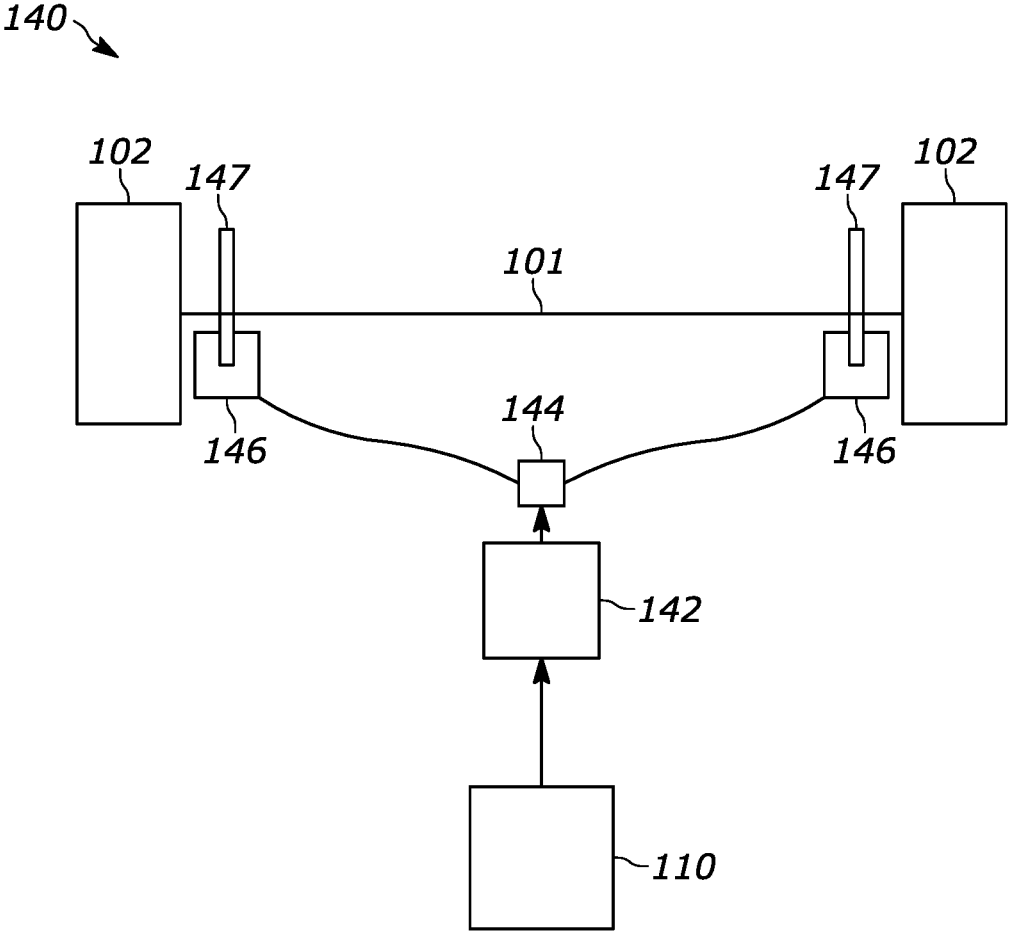
FIG. 2 shows a schematic view of a braking system for a vehicle according to an embodiment.

FIG. 2 illustrates a schematic of a brake system or braking system 140 of the vehicle 100 according to an embodiment. The braking system 140 illustrated is, for example, a hydraulically-actuated disc brake system in which two drive wheels 102 are arranged on an axle 101 of the vehicle 100, with each wheel 102 having a brake including a brake caliper 146 and a brake disk 147. Each brake disk 147 is fixed with one of the wheels 102 and therefore transmits a braking force to that associated wheel 102. When braking, brake linings are pressed into the brake disk 147 by hydraulically actuated pistons in the brake caliper 146, with the friction between the brake disk 147 and the brake linings causing the braking force. In order to actuate the pistons, a hydraulic fluid must be pressurized, which is done by a brake actuator 144, which can be a pump for example. The brake actuator 144 is, in turn, controlled by a brake controller 142. The brake controller 142 can be part of an electronic stability program (ESP) or anti-lock braking system (ABS) system.

The brake controller 142 can be commanded to operate based on instructions from the vehicle controller 110. For example, the vehicle controller 110 may determine that an autonomous braking event is needed due to the presence of an object in front of the vehicle as sensed by vehicle sensors 120 and/or 130. The vehicle controller 110 commands the brake controller 142 to activate and initiate braking on the drive wheels 102. The amount of braking requested can be controlled by either the brake controller 142 or the vehicle controller 110. In one embodiment, vehicle controller 110 outputs a brake signal that is delivered to the brake controller 142, indicating the need for braking based on the sensed objects in the environment 200. The brake controller 142, in turn, processes the brake signal and issues a corresponding brake request signal to brake actuator 144, wherein the brake request signal represents an amount of braking necessary to slow the vehicle to a desired speed as dictated by the vehicle controller 110.

Various sensors can be included in the brake system 140 to generate vehicle braking or deceleration data. For example, a vehicle speed sensor can be provided to determine the rotational speed of the wheel(s) 102 and/or axle 101. A brake pressure sensor can be provided to determine the amount of hydraulic pressure delivered to the vehicle brakes. A brake pedal sensor can be provided to determine the amount of brake pedal movement, indicating an amount of brake demands from the driver. Other pressure sensors can be provided to determine the amount of pressure provided by calipers 146. These sensors can be configured to provide the deceleration data described herein.

It should be understood that the brake system 140 illustrated here is merely exemplary, and the teachings disclosed herein can be applied to other brake systems. For example, the brake system may be a regenerative braking system in which an electric motor converts kinetic energy into electrical energy during deceleration. This recovered energy is then used to recharge the vehicle's battery. Hydraulic braking can be used with friction braking, with one supplementing the other. A controller can be used to issue the proper brake request signals to each of the hydraulic braking and the friction braking systems to provide the vehicle with the desired deceleration. The braking system can also be or include electromagnet brakes, air brakes (e.g., in heavy-duty vehicles or large trucks), or the like. In any of these systems, when implemented in an autonomous or semi-autonomous vehicle, a controller provides the desired brake request signals based on signals from another vehicle controller regarding sensed objects in the environment.

The controllers described herein, such as controller 110 and brake controller 142, can be configured to receive information, process the information, and output instructions. For example, the VECU 110 can be configured to receive sensor data from the vehicle sensors 120/130, process the sensor data to determine the presence of an object nearby the vehicle in the environment 200, and issue a braking command to the brake controller 142 to activate the brakes. Likewise, the brake controller 142 can receive a command from the vehicle controller 110, determine an appropriate amount of braking necessary to fulfill the deceleration demands of the vehicle, and issue appropriate signals to the brake actuator 144 to actuate the vehicle brakes. In this disclosure, the terms "controller" and "system" may refer to, be part of, or include processor hardware (shared, dedicated, or group) that executes code and memory hardware (shared, dedicated, or group) that stores code executed by the processor hardware. The code is configured to provide the features of the controller and systems described herein. In one example, the controller may include a processor, memory, and non-volatile storage. The processor may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on computer-executable instructions residing in memory. The memory may include a single memory device or a plurality of memory devices including, but not limited to, random access memory ("RAM"), volatile memory, non-volatile memory, static random-access memory ("SRAM"), dynamic random-access memory ("DRAM"), flash memory, cache memory, or any other device capable of storing information. The non-volatile storage may include one or more persistent data storage devices such as a hard drive, optical drive, tape drive, non-volatile solid-state device, or any other device capable of persistently storing information. The processor may be configured to read into memory and execute computer-executable instructions embodying one or more software programs residing in the non-volatile storage. Programs residing in the non-volatile storage may include or be part of an operating system or an application, and may be compiled or interpreted from computer programs created using a variety of programming languages and/or technologies, including, without limitation, and either alone or in combination, Java, C, C++, C#, Objective C, Fortran, Pascal, Java Script. Python, Perl, and PL/SQL. The computer-executable instructions of the programs may be configured, upon execution by the processor, to, for example, generate vehicle deceleration data during several braking events, execute a learning model on the deceleration data to estimate a brake wear, modify the brake table based on the estimated brake wear, and generate new braking commands using the modified brake table.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs embodied on a tangible medium, e.g., one or more modules of computer program instructions, encoded on one or more computer storage media for execution by, or to control the operation of, a data processing apparatus. A computer storage medium can be, or be included in, a computer-readable storage device, a computer-readable storage substrate, a random or serial access memory array or device, or a combination of one or more of them. The computer storage medium can also be, or be included in, one or more separate components or media (e.g., multiple CDs, disks, or other storage devices). The computer storage medium may be tangible and non-transitory.

A computer program (also known as a program, software, software application, script, or code) can be written in any form of programming language, including compiled languages, interpreted languages, declarative languages, and procedural languages, and the computer program can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, libraries, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., a field programmable gate array ("FPGA") or an application specific integrated circuit ("ASIC"). Such a special purpose circuit may be referred to as a computer processor even if it is not a general-purpose processor.

Various machine-learning models can be used by either vehicle controller 110 and/or brake controller 142 to issue the proper braking commands necessary to brake the vehicle based on the detected environment 200 surrounding the vehicle. In one embodiment, the controllers can rely on computer vision machine learning models to control the maneuvering (e.g., braking) of the vehicle. In this context, cameras, lidar, radar, ultrasonic, and the like (e.g., from vehicle sensors 120/130) capture real-time images and data from the vehicle's surroundings 200. Machine learning algorithms then process this data to identify and classify objects. Object detection algorithms like YOLO (You Only Look Once) or Faster R-CNN are employed to locate objects within the images. These algorithms use convolutional neural networks (CNNs) to analyze various features, such as edges, shapes, and colors, to pinpoint objects of interest. Once the objects are detected, machine learning models for classification enable the computing system to recognize the type of object, such as pedestrians, other vehicles, or road signs.

In embodiments, the machine-learning models disclosed herein (e.g., YOLO, Faster R-CNN, etc.) involve a combination of processors and memory (e.g., shown in FIGS. 2-3) to efficiently process the image data to make accurate predictions. First, the input images captured by the cameras and/or other vehicle sensors are loaded into memory for processing. Before feeding the image data to the object detection model, preprocessing steps can be applied, such as resizing the image to a fixed size and normalizing the pixel values. These operations are performed by the on-board processor(s) and are relatively lightweight in terms of memory usage. Both YOLO and Faster R-CNN utilize convolutional neural networks (CNNs) for feature extraction. These networks consist of multiple layers of convolutional and pooling operations. The layers in these networks have weights and biases that are learned during training. The CNN layers extract features like edges, textures, and shapes from the image. The memory used by these layers depends on the network architecture and the size of intermediate feature maps. After feature extraction, the processed image data is passed through the object detection head, which is responsible for predicting bounding boxes and class probabilities. In the case of YOLO, a single convolutional network predicts bounding boxes and class probabilities directly. In the case of Faster R-CNN, a region proposal network (RPN) suggests potential regions of interest, which are then refined and classified. Once the object detection head makes predictions, post-processing is performed to filter and refine the results. This may include non-maximum suppression to eliminate duplicate detections and thresholding to retain only high-confidence predictions. The final detected objects, along with their bounding boxes and class labels, can be stored in memory or used for further processing, such as making decisions in an autonomous vehicle's control system (e.g., braking the vehicle such that the vehicle avoids the detected object).

In other embodiments, rather than YOLO or Faster R-CNN, other machine-learning models can be implemented. For example, Single Shot Multi-Box Detector (SSD) can be used wherein a single deep neural network is used to predict bounding boxes and class scores at multiple scales within the image to detect objects of varying sizes effectively. In another embodiment, RetinaNet, EfficientDet, or other object-recognition machine-learning models are used for object detection, which can then be used as input to issue necessary braking commands to avoid the objects if necessary.

Figure 3:
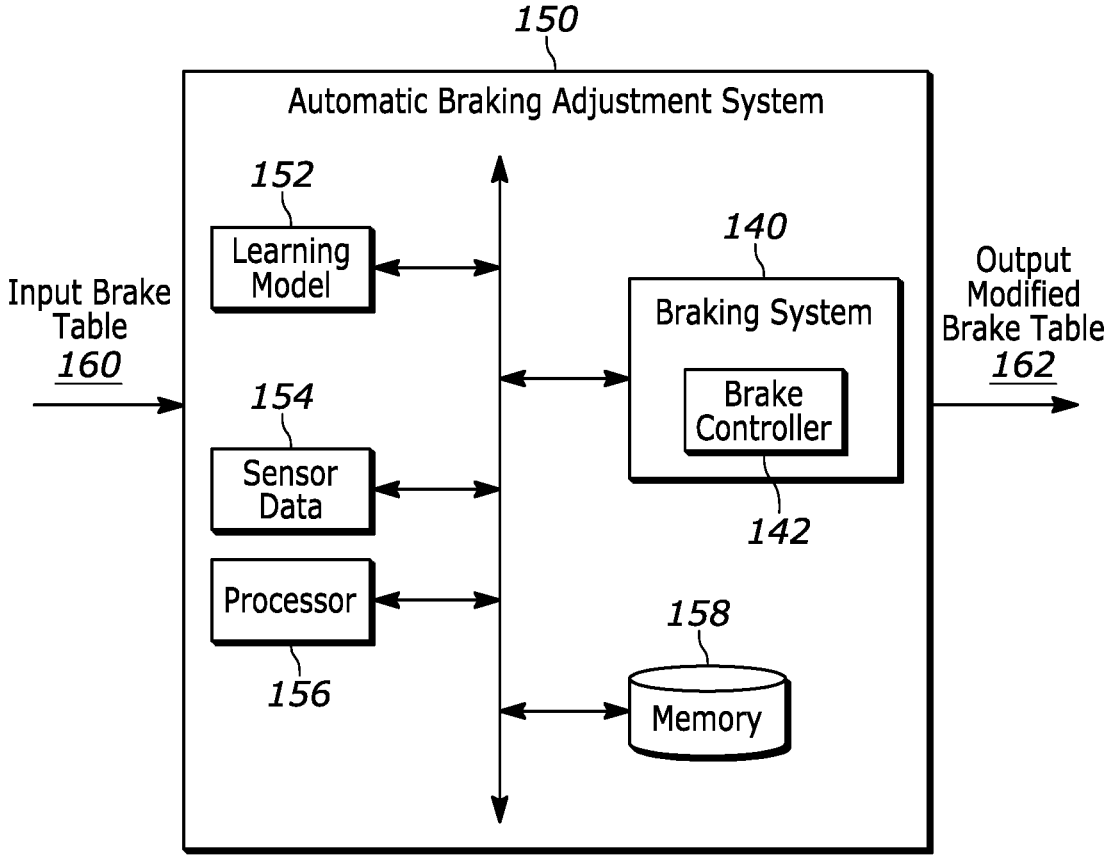
FIG. 3 shows a block diagram of an automatic braking adjustment system, according to an embodiment.

FIG. 3 illustrates a block diagram of an example, non-limiting system 150 that can facilitate modification of a brake table and adjustment of applied braking force of a braking component of a vehicle in accordance with one or more embodiments described herein. In various non-limiting embodiments, the system 150 can be associated with or included in a vehicle processing system, brake adjustment system, data analytics system, data processing system, or the like. Aspects of the system 150, apparatuses, or processes explained in this disclosure can constitute machine-executable components embodied within machines, e.g., embodied in one or more computer readable mediums associated with one or more machines. Such components, when executed by the one or more machines, e.g., computers, computing devices, virtual machines, etc. can cause the machines to perform the operations described herein.

In an embodiment, the automatic braking adjustment system 150 includes a learning model 152 that is configured to estimate brake wear based on changes over time in differences between (a) the desired brake requests issued during the braking events and (b) the vehicle speeds during the brake requests. The system 150 also includes sensor data 154, representing data received or generated by vehicle sensors 120/130. The sensor data 154 can also include data received by other vehicle sensors described above, such as those sensors configured to output signals indicative of vehicle speeds during the brake requests, the commanded brake pressure, the actual brake pressure, the deceleration of the vehicle during the brake request, and the time it takes the vehicle to slow down or stop to the desired speed stop. The system 150 also includes at least one processor 156 that can execute the computer executable components and/or instructions stored in memory 158 to carry out the functions described herein, as described above. The processor can act based on the generated deceleration data. The system 150 also includes or is otherwise associated with the braking system 140 described above, including the brake controller 142 that provides the necessary brake request signals to actuate the vehicle brakes.

In general, as will be described further below, the automatic braking adjustment system 150 receives or utilizes a brake table as input 160, and in turn outputs a modified brake table 162. As described above, in the context of a non-autonomous brake system, the brake table is a data structure that establishes a correspondence between the driver's input (i.e., brake pedal pressure or force) and the desired braking force applied to each wheel; in the context of an autonomous braking system, the brake table establishes a correspondence between the sensor data that generates a brake request, and the in-turn desired braking force applied to each wheel. In another embodiment in the context of an autonomous braking system, the brake table establishes a correspondence between the desired brake request as issued by the brake controller 142 and the actual applied brake force at the wheel(s). In other words, it can represent a comparison between the brake force requested and the brake force realized. These exemplary tables can be used to understand how much brake force should be requested in order to safely brake the vehicle. This table can be used by the vehicle's control system (e.g., VECU 110 and/or brake controller 142) to modulate the braking force on each wheel, ensuring optimal braking performance and avoiding any detected objects in the environment 200.

The learning model 152 can be or utilize one or more of the machine-learning models described above. In general, the learning model 152 is configured to estimate brake wear based on changes in differences between (a) the desired brake requests issued during the braking events and (b) the vehicle speeds during the brake requests. The learning model 152 can take into account vehicle features such as vehicle speed, brake pressure, and time to stop (or slow down to a specific speed), in an effort to learn how the braking system 140 responds to desired brake requests. These vehicle features can be collected as data over time, over several (e.g., hundreds or thousands) braking iterations in the vehicle 100. By looking at the desired brake request along with the collected data occurring during the brake event, the learning model 152 can estimate brake wear.

For example, a vehicle with brand new brakes will brake more quickly (with the same amount of hydraulic brake pressure) than a vehicle with brakes that have been used during driving over thousands of miles. This is a result of work brakes and brake wear, as described above. Therefore, the learning model 152 can take vehicle speed, brake pressure, and time to stop or slow down as input over time; as these features change over time that represent a reduction in braking to the vehicle even using the same amount of hydraulic brake pressure, the learning model 152 can estimate brake wear is present, and to what degree.

Consider an example use case. While a driver is operating a vehicle and braking normally, the vehicle's controllers are running calculations on whether the brake table is sufficient to brake the vehicle in the amount of time it takes the user to stop or slow down. For example, a vehicle driving at 10 kilometers per hour (kph) and coming to a stop, the automatic braking adjustment system can determine if this distance to stop aligns with the distance to stop from previous braking events using the original (or previous) braking tables. If there is alignment, then the vehicle can continue to use the same brake table for future manual or autonomous braking events. Now, say the vehicle has been driven 20,000 miles of hard braking events. The time to brake safely and avoid a detected object may be compromised. Therefore, using the vehicle's data compiled over time (e.g., the life of the vehicle), the system can calculate a better brake table that would ensure autonomous brake feature functions at the highest quality for the worn brakes.

FIG. 4 illustrates a method 170 of adjusting vehicle braking performance based on estimated brake wear, according to an embodiment. The method can be performed by one or more controllers or processors described above.

At 172, a brake table is stored in memory. The brake table establishes a correspondence between the driver's input (i.e., brake pedal pressure or force) and the desired braking force applied to each wheel. In the context of an autonomous braking system, the brake table establishes a correspondence between the sensor data that generates a brake request, and the in-turn desired braking force applied to each wheel. This brake table can be used by the vehicle immediately upon its first drive. It is referred to by the various braking controllers (e.g., brake controller 142) to determine how much brake force to command based on either the amount of brake pedal movement or the sensor data indicating detected objects in the environment 200 adjacent the vehicle.

At 174, the vehicle sensors generate vehicle deceleration data over several braking events. The vehicle deceleration data can include, for example, the magnitude of the desired brake requests issued by the controller during the braking events, the vehicle speeds during the brake requests, the commanded brake pressure, the actual brake pressure, the deceleration of the vehicle during the brake request, and the time it takes the vehicle to slow down or stop to the desired speed stop. This data can be generated by a vehicle speed sensor, a brake pressure sensor, and the like as described above. This vehicle data can be included or part of sensor data 154, for example. At 176, this vehicle deceleration data is stored in storage or memory, such as memory 158.

At 178, the learning model 152 is executed on the stored deceleration data to estimate brake wear. In embodiments, the learning model 152 is configured to estimate the brake wear based on changes, over time, in the differences between (a) the desired brake requests issued during the braking events (e.g., brake pedal movement, signal amplitude for requesting brakes, etc.) and vehicle speeds and/or deceleration realized during the brake requests. As this difference increases over the age of the vehicle, the learning model 152 can estimate a corresponding increase in brake wear.

At 180, the brake table is modified based on the estimated brake wear; this yields a modified brake table to be used in future braking events. The modified brake table assures that given a desired brake request, additional braking magnitude will be requested to offset the brake wear. For example, at 182, the modified brake table is relied upon to generate a new applied brake force based on a new desired brake request. The new applied brake force may exceed what would otherwise be applied if the brake table is not modified.

In an embodiment, one or more of the controllers disclosed herein can recognize when the vehicle has been serviced for new brakes, and reset the braking table to its original braking table. For example, when one or more sensors of the vehicle recognize that new brakes are installed, the braking system 140 can access and utilize the braking table that was previously utilized prior to its modification. The controllers can determine that new brakes are installed by again executing the learning model on new deceleration data. Alternatively, a service technician can inform the vehicle and its controllers that new brakes were installed.

In an embodiment, one or more of the controllers disclosed herein can alert the driver or vehicle that new brakes may be needed. This can be determined based on the estimated brake wear. For example, if the estimated brake wear rises to a predefined threshold, the vehicle can output an alert (e.g., visual, audible, etc.) to alert the driver that the brakes are worn and the vehicle should be serviced for new brakes.

In an embodiment, one or more of the controllers disclosed herein can be configured to utilize the machine-learning models to estimate, in real-time during a new brake event, a magnitude of brake fade based on a temperature of a vehicle brake. For example, as the temperature of the vehicle brake (e.g., brake pad, liner, or other components of the vehicle brake system) increase, the amount of brake fade can correspondingly increase. The learning model can learn how the determined brake fade or temperature affects the actual braking of the vehicle over time, similar to how estimated brake wear is determined (e.g., using vehicle deceleration data over time as compared to the temperature). Once learned, the brake table can be modified based on the estimated brake fade and/or temperature.

It should be understood that according to the teachings herein, modifying the brake table in order to adjust the desired brake request is different than modifying the brake table in order to adjust the hydraulic brake pressure. For example, prior art systems may modify brake tables so that when a given brake request is issued, an increased amount of hydraulic brake pressure is provided compared to when the original brake table is utilized. In contrast, the teachings herein allow the brake pressure to remain the same throughout the lifetime of the vehicle, and instead the controllers account for the brake wear by increasing the magnitude of the brake request signal. This allows the system to initiate the braking process earlier than the original brake table to ensure the same smooth but effective braking. For example, assuming a vehicle is moving at 5 kilometers per hour (kph), and an object is detected in the path of the vehicle. An initial brake table may initiate braking when the vehicle has reached a detected distance of five feet away from the object in order to safely brake without contacting the object. In prior art systems, after this vehicle succumbs to wear, this same braking event may require the braking to start when the vehicle has reached a detected distance of five feet away, except now with more brake pressure being demanded. However, according to the teachings herein, rather than only increasing the brake pressure to account for the wear, the systems herein can initiate the braking event at a further distance (e.g., 5.5 feet) from the object and change the brake pressure ensure a smoother braking event.

In embodiments, one or more of the controllers disclosed herein can be configured to communicate with other vehicles on the road to adjust the brake table. This can include a communication of the vehicle deceleration data or the estimated brake wear from a first car to a second car in order for the second car to modify its brake table accordingly. To do so, the communicating vehicles may include respective a wireless communication hub which can include a modem, a network card, an infrared communication device, a wireless communication device, and/or a chipset (such as a Bluetooth device, an IEEE 802.11 device, an IEEE 802.16.4 device, a WiFi device, an LTE device, cellular communication facilities including 4G, 5G, etc.), and/or the like. The wireless communication hub can permit data to be exchanged with a wireless communication network, wireless access points, other computing systems, etc. The communication can be carried out via one or more wireless communication antenna that sends and/or receives wireless signals. The vehicles may be configured to share the vehicle deceleration data via, for example, dedicated short range communication (DSRC) or the like. The systems may be configured such that the vehicle deceleration data from a first vehicle of one type (e.g., make and model) is communicated to a second vehicle of the same type (e.g., same make and model) so that the second vehicle can update or adjust its brake table based upon the deceleration data of the first vehicle.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A method of adjusting vehicle braking performance based on estimated brake wear, the method comprising:
   storing a brake table in storage associated with a vehicle, wherein the brake table includes a correspondence between a desired brake request and an applied brake force;
   generating vehicle deceleration data during several braking events of the vehicle, wherein the vehicle deceleration data includes (i) desired brake requests issued during the braking events, and (ii) vehicle speeds during the brake request;
   storing the vehicle deceleration data in the storage;
   executing a learning model on the deceleration data stored in the storage, wherein the learning model is configured to estimate a brake wear based on changes in differences between (a) the desired brake requests issued during the braking events and (b) the vehicle speeds during the brake requests;
   modifying the brake table based on the estimated brake wear in order to yield a modified brake table; and
   generating a new desired brake request utilizing the modified brake table.

2. The method of claim 1, wherein the desired brake requests issued during the braking events include at least one of (i) brake requests originating from a physical depression of a brake pedal, and (ii) brake requests originating autonomously from an autonomous braking event.

3. The method of claim 1, wherein the vehicle deceleration data further includes, for each braking event, an amount of time elapsing between an initiation of that braking event and a moment when the vehicle has stopped, and wherein the learning model is configured to estimate the brake wear based on the amount of time.

4. The method of claim 1, wherein the vehicle includes an autonomous braking system configured to utilize the modified brake table to autonomously generate the new desired brake request based on vehicle sensors configured to detect objects external to the vehicle.

5. The method of claim 1, wherein:
the learning model is a machine learning (ML) model that is configured to determine brake patterns of the vehicle,
the brake patterns are associated with an aggressiveness of desired brake requests, and
the ML model is further configured to estimate the brake wear based upon the brake patterns.

6. The method of claim 1, further comprising:
estimating, in real-time during a new brake event, a magnitude of brake fade based on a temperature of a vehicle brake; and
modifying the brake table based on the estimated magnitude of brake fade.

7. The method of claim 1, wherein the vehicle includes an autonomous braking system including vehicle sensors configured to detect objects external to the vehicle, and wherein the new desired brake request is based on a physical depression of a brake pedal, the method further comprising:
determining that the new desired brake request will not safely brake the vehicle to avoid a collision with a detected object external to the vehicle; and
supplementing the new desired brake request with an additional applied brake force via the autonomous braking system in order to safely brake the vehicle by avoiding the collision, wherein the additional applied brake force is determined based on the modified brake table.

8. A system for estimating brake wear and adjusting vehicle braking performance in a vehicle, the system comprising:
a storage that stores a brake table associated with a vehicle, wherein the brake table is accessed during a braking event and includes a correspondence between a desired brake request and an applied brake force;
a plurality of image sensors configured to detect objects in an environment surrounding the vehicle;
a plurality of vehicle sensors configured to generate deceleration data associated with deceleration of the vehicle, the vehicle deceleration data includes (i) desired brake requests issued during the braking events, and (ii) vehicle speeds during the brake request; and
a processor in communication with the storage, the plurality of image sensors, and the plurality of vehicle sensors, wherein the processor is programmed to:
generate, via the vehicle sensors, the deceleration data over a series of braking events of the vehicle;
execute a learning model on the deceleration data, wherein the learning model is configured to estimate a brake wear based on changes in differences between (a) the desired brake requests issued during the braking events and (b) the vehicle speeds during the brake requests;
modify the brake table based on the estimated brake wear in order to yield a modified brake table; and
generate, in response to the image sensors detecting one or more objects in the environment, a new desired brake request utilizing the modified brake table.

9. The system of claim 8, wherein the desired brake requests issued during the braking events include at least one of (i) brake requests originating from a physical depression of a brake pedal, and (ii) brake requests originating autonomously from an autonomous braking event.

10. The system of claim 8, wherein the vehicle deceleration data further includes, for each braking event, an amount of time elapsing between an initiation of that braking event and a moment when the vehicle has stopped, and wherein the learning model is configured to estimate the brake wear based on the amount of time.

11. The system of claim 8, wherein:
the learning model is a machine learning (ML) model that is configured to determine brake patterns of the vehicle,
the brake patterns are associated with an aggressiveness of desired brake requests, and
the ML model is further configured to estimate the brake wear based upon the brake patterns.

12. The system of claim 8, wherein the processor is further programmed to:
estimate, in real-time during a new brake event, a magnitude of brake fade based on a temperature of a vehicle brake; and
modify the brake table based on the estimated magnitude of brake fade.

13. The system of claim 8, wherein the processor is further programmed to:
communicate the deceleration data or the estimated brake wear to a second vehicle, wherein a second processor of the second vehicle modifies a second brake table based on the communicated deceleration data or estimated brake wear.

14. A tangible, non-transitory computer-readable medium having instructions stored thereon that are executable by one or more processors to cause an automatic braking adjustment system to perform functions, the functions comprising:
storing a brake table in storage associated with a vehicle, wherein the brake table includes a correspondence between a desired brake request and an applied brake force;
generating vehicle deceleration data during several braking events of the vehicle, wherein the vehicle deceleration data includes (i) desired brake requests issued during the braking events, and (ii) vehicle speeds during the brake request;
storing the vehicle deceleration data in the storage;
executing a learning model on the deceleration data stored in the storage, wherein the learning model is configured to estimate a brake wear based on changes in differences between (a) the desired brake requests issued during the braking events and (b) the vehicle speeds during the brake requests;
modifying the brake table based on the estimated brake wear in order to yield a modified brake table; and
generating a new desired brake request utilizing the modified brake table.

15. The tangible, non-transitory computer-readable medium of claim 14, wherein the desired brake requests issued during the braking events include at least one of (i) brake requests originating from a physical depression of a brake pedal, and (ii) brake requests originating autonomously from an autonomous braking event.

16. The tangible, non-transitory computer-readable medium of claim 14, wherein the vehicle deceleration data further includes, for each braking event, an amount of time elapsing between an initiation of that braking event and a moment when the vehicle has stopped, and wherein the learning model is configured to estimate the brake wear based on the amount of time.

17. The tangible, non-transitory computer-readable medium of claim 14, wherein the vehicle includes an autonomous braking system configured to utilize the modified brake table to autonomously generate the new desired brake request based on vehicle sensors configured to detect objects external to the vehicle.

18. The tangible, non-transitory computer-readable medium of claim 14, wherein:

the learning model is a machine learning (ML) model that is configured to determine brake patterns of the vehicle, the brake patterns are associated with an aggressiveness of desired brake requests, and the ML model is further configured to estimate the brake wear based upon the brake patterns.

19. The tangible, non-transitory computer-readable medium of claim 14, wherein the functions further comprise:

estimating, in real-time during a new brake event, a magnitude of brake fade based on a temperature of a vehicle brake; and modifying the brake table based on the estimated magnitude of brake fade.

20. The tangible, non-transitory computer-readable medium of claim 14, wherein the vehicle includes an autonomous braking system including vehicle sensors configured to detect objects external to the vehicle, and wherein the new desired brake request is based on a physical depression of a brake pedal, wherein the functions further comprise:

determining that the new desired brake request will not safely brake the vehicle to avoid a collision with a detected object external to the vehicle; and supplementing the new desired brake request with an additional applied brake force via the autonomous braking system in order to safely brake the vehicle by avoiding the collision, wherein the additional applied brake force is determined based on the modified brake table.

* * * * *